April 16, 1968  J. MEDNEY  3,378,426
APPARATUS FOR FORMING CONTINUOUS HELICAL COILS
OF RESIN BONDED GLASS FIBERS
Filed Oct. 5, 1964  2 Sheets-Sheet 1
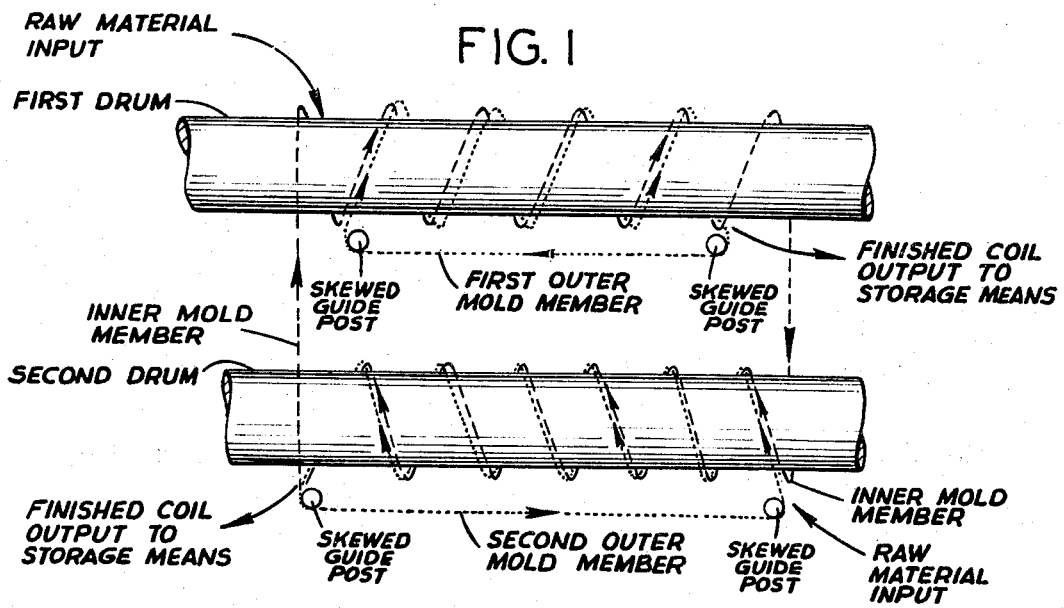
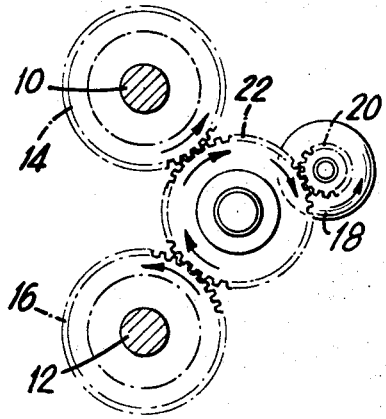
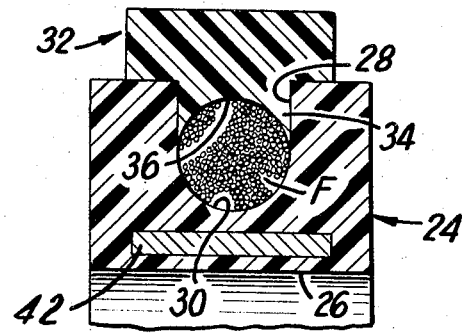
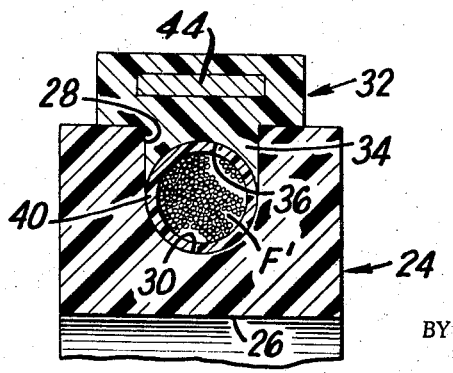
INVENTOR.
JONAS MEDNEY
BY
Leonard H. King
ATTORNEY.

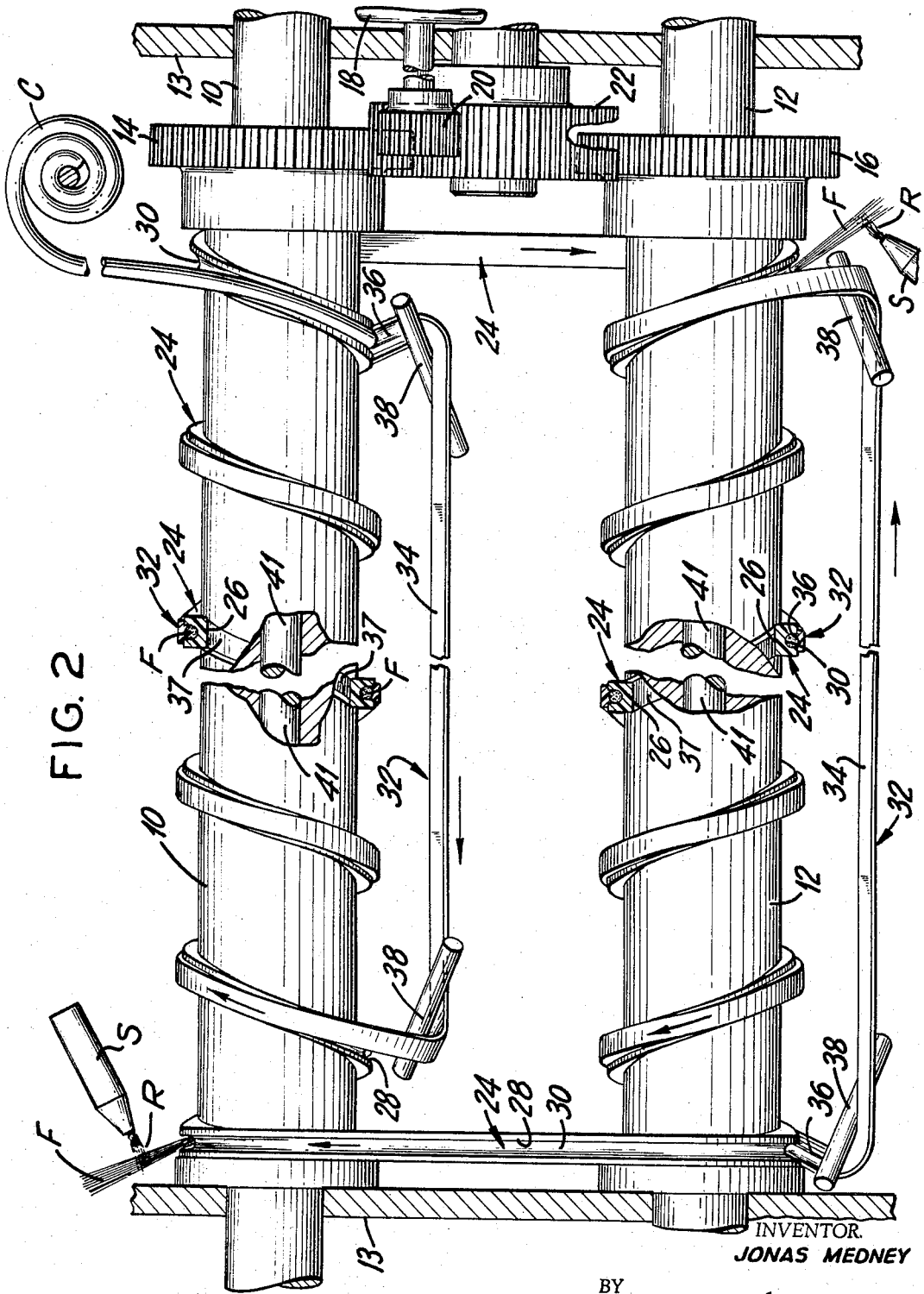

3,378,426
APPARATUS FOR FORMING CONTINUOUS HELICAL COILS OF RESIN BONDED GLASS FIBERS

Jonas Medney, Oceanside, N.Y., assignor to Koppers Company, Inc., a corporation of Delaware
Filed Oct. 5, 1964, Ser. No. 401,527
9 Claims. (Cl. 156—430)

ABSTRACT OF THE DISCLOSURE

First and second parallel, spaced apart drums are power driven in opposite rotation and an endless flexible inner mold member is helically arranged on each drum. First and second endless outer mold members cooperate respectively with the inner mold member on the first and second drums. Resin impregnated filamentary material is fed into the space between the coacting inner and outer mold members at one end of the drums and a product, formed as the endless members advance helically around the drums, is removed at the other end of the drums.

---

This invention relates generally to helical, adhesively secured, filamentary members and more particularly to apparatus for the continuous fabrication thereof.

The product of this invention has a wide range of diverse applications. For instance, coil springs comprised of resin bonded glass fibers of almost any length may be formed and in addition, the resulting coil may be cut up into hoops and used as a reinforcement member. One current use for a single turn length of coil is as a form-shaping and support member for brassiere cups. Still other uses for a continuous length of coil is in coil cords for electrical appliances and as a reinforcement for a flexible hose.

In its simplest form, the apparatus of the present invention comprises a rotary driven drum about which is helically and tightly wrapped an endless, inner mold member having a concave mold face projecting outwardly from the mold member. As the drum is rotated, the inner mold member advances therealong without slippage. An endless outer mold member is also helically wound on the inner mold member so that the concave molding face on the outer mold member faces inwardly in opposition to the molding face of the inner mold member to define a helical cavity or molding chamber therebetween, the outer mold member being adapted to advance together with the inner mold member. As will be brought out more fully hereinafter, the first and last turns of the inner mold member, or at least a portion thereof, are left exposed or uncovered by the outer mold member. By this means, raw material such as resin-bonded glass fibers may be fed into the helical molding chamber at one end of the drum and the finished product removed from the other end of the drum.

In the preferred embodiment which will be used subsequently for purposes of description, the output of the apparatus is doubled by employing one set of continuous molds and a pair of parallel drums which may both be conveniently driven from a single power source. The inner, continuous mold member starts at one end of the first drum, is helically wound over the length thereof with the mold face directed outwardly, and is then helically wrapped in a similar manner but in the opposite direction on the second drum. The inner mold member leaves the second drum in the same transverse plane as its starting point on the first mandrel. Both ends of the inner mold member are suitably joined so that it is a continuous, circulating unit. The inner mold member is frictionally driven by the rotation of the drum.

Each drum is provided with its own outer mold member, helically wound over a portion of the inner mold member to define a molding cavity or chamber therebetween. Similarly, each outer mold member is a self-contained, continuous and circulating element. Suitably skewed guide posts are provided at each end of each drum so that subsequent to its helical path, the outer mold member returns to its starting point in a substantially straight line parallel to the longitudinal axis of the drum. Since a single, continuous inner mold member traverses the two parallel drums, a simple gear train including an idler gear is employed to impart similar rotational direction. In the preferred embodiment, the glass fibers are fed to each drum at the beginning of common travel of the inner and outer mold members and the finished product is removed from the opposite end of each drum at the end of the common mold travel. In other words, the glass fibers are initially fed to the molds at the lefthand side of one drum and at the righthand side of the other drum. Alternatively, bundles of glass fibers may be used which are covered by a winding, wrapping or sheath.

By way of example, the mold members may be extruded from Delrin, a thermosetting resin of the type known as acetal resin or polypropylene and the resin to bond the glass fibers may be an epoxy resin, polyester, or other suitable resin. The drums may be heated to provide curing means for the resin.

Accordingly, it is an object of the present invention to provide improved molding apparatus for forming continuous helical coils.

It is another object to provide molding apparatus having helically movable mold members.

Still another object is to provide a pair of drums with a first continuous mold member and a pair of second mold members mating therewith.

These and other objects, features and advantages of the invention will, in part, be pointed out with particularity and will, in part, become obvious from the following more detailed description of the invention taken in conjunction with the accompanying drawing which forms an integral part thereof.

In the various figures of the drawing, like reference characters designate like parts.

In the drawing:

FIG. 1 is a diagrammatic illustration of the winding pattern employed with the continuous molding apparatus of the present invention;

FIG. 2 is a partly schematic, longitudinal elevation view of the drums, mold members and drive means of the present invention;

FIG. 3 is an end elevation taken along line 3—3 of FIG. 2;

FIG. 4 is an enlarged cross sectional view of the mold belts; and

FIG. 5 is an enlarged cross sectional view of an alternative embodiment wherein a wrapped bundle of fibrous material is molded.

Referring now to the drawing, FIG. 1 diagrammatically illustrates the molding apparatus of the present invention. The first and second drums are rotated in the same angular direction by means of a motor and a drive system such as a gear train, friction rollers, pulleys, etc. Inner mold member, shown as a dashed line, is seen to be of the "endless" type and helically wound on both first and second drums. First and second outer mold members represented as dotted lines, are also of the "endless" type and are helically wound on the first and second drums, respectively. As will be seen more clearly in FIG. 2, the first and last turns of the inner mold member on each drum are not completely covered by the outer mold member.

This arrangement permits the input of fibrous material between the mold members at the lefthand side of the first drum and the removal of the molded article in the form of a helical coil at the righthand side of the first drum. The input and output ends of the second drum are just the opposite of the first drum since both drums are rotated in the same direction and the inner mold member is continuous. Guide posts are provided at each end of each drum to return the outer mold members from the output end to the input end of their respective drums.

FIG. 2 illustrates schematically the physical relation of the components of one embodiment of the present invention. Drums 10 and 12 are suitably journaled for rotation about their longitudinal axes in a machine frame 13. At one end of each drum, gears 14 and 16 are affixed, the gears being driven by motor 18 through pinion 20 and idler gear 22. It will be seen in FIG. 3 that both gears and the motor pinion rotate in the same direction.

Inner mold member 24 (FIG. 2 and FIG. 4) is generally either square or rectangular in cross section. Mold member 24, provided with a lower face 26 and a longitudinal groove 28 having a round bottom, or molding face 30 may be extruded from a suitable thermosetting plastic such as "Delrin," nylon, or polypropylene. Groove 28 and mold face 30 face outwardly from the drum and are, in combination, one-half of the mold cavity. The ends of a convenient length of the extruded plastic are suitably joined together and the inner mold member 24 is helically positioned on the spaced, parallel drum 10 and 12, as shown in FIG. 2.

Outer mold member 32, also extruded from a suitable thermosetting plastic such as "Delrin," nylon, or polypropylene, is generally in the form of a T. Leg portion 34 is substantially the same size as groove 28 in inner mold member 24 and is provided with a concave mold surface 36 at the end thereof. If the finished article is to be circular in cross section, then the confronting mold faces 30 and 36 of members 24 and 30, respectively, will both be semicircular. Other cross sectional configurations of the finished article will be similarly apportioned between the two confronting mold members.

Outer mold member 32 is interlockingly fitted on substantially all of the helically wound portions of inner mold members 24. As shown in FIG. 2, at least a portion of the first and last turn of the inner mold member on each of the drums 10 and 12 remain exposed. FIG. 4 illustrates the fit between the mold member wherein it will be seen that leg portion 34, disposed in groove 28, prevents relative movement between the mold members. The absence of the outer mold member on the first and last turns of the inner mold members permits the insertion of a bundle of filamentary material F and also permits the coiled finished product C to be removed and stored in a suitable container.

Suitable means are preferably included to accurately guide the interlocked mold members in a helical path. The guide means could take the form of a plurality of pins disposed radially in the drum in a helical pattern or a raised, helical shoulder of a continuous form could be provided. However, for simplicity of illustration a helical groove 37 is formed in the surface of the drums so that the inner mold member may be slidingly disposed therein. It has also been found to be desirable to include a lubricant in groove 37 to reduce the frictional drag.

A plurality of skewed guide posts 38 are provided at each end of each drum. These guide posts, suitably supported in the machine frame, serve to gently turn the outer mold members both into and out of the inner mold members. It is also within the scope of the present invention to position a sufficient number of skewed guide posts so that only a single outer mold member is required. In other words, the single outer mold member would be helically wrapped about a portion of the inner mold member in the first drum, then passed transversely over to the second drum where it is wound in an equal but opposite helical angle, before returning transversely to the first drum. Two outer mold members have been illustrated only for ease of description.

FIG. 5 illustrates an alternative embodiment wherein a bundle of filamentary material F' is encased or wrapped in a sheath 40. All other structural aspects of the invention remain the same. The arrangement shown in FIG. 5 is advantageous where the application of the product requires surface conditions of particular color, texture or similar criteria.

An uncured or partially cured thermosetting resin R may be coated on the filamentary material by any suitable means such as spraying apparatus S just prior to its placement between the mold members. Still another conventional method of impregnating the fibers is to pass them through a liquid resin bath before applying them between the mold members. Still other impregnating methods known in the art may be employed without diminishing the scope of the present invention.

Depending upon the choice of resin and other related factors, suitable heating elements energized by a conventional power source may be provided in either one or both of the drums. By way of example, heating element 41 is shown longitudinally disposed within the drums 10 and 12. Referring once again to FIG. 4 and FIG. 5, still another heating arrangement is shown. Metallic bands 42 and 44 may be heated by a conventional induction heating unit not shown. The metal band may be contained in either one or both mold members. At any convenient point, the coil of the induction heating unit would surround the particular mold member containing the metal band. If desired, the plastic mold may be filled with metallic particles and capacitance heating means employed. The illustration of the heating elements is by way of example only, it being understood that the selection of a particular heating element or combination of heating elements is within the skill of a competent designer in this field.

The so-called epoxide resins are presently preferred for the purpose of this application. Epoxide compounds are those compounds having an ether oxygen atom joined to two vicinal carbon atoms. The term "epoxide resin," as used in the present specification and in the appended claims, denotes the resinous reaction product of certain of these epoxide compounds and compounds having available hydrogen atoms linked to carbon atoms by oxygen atoms, as for example, polyhydric phenols and polyhydric alcohols. A particularly useful epoxide resin is the reaction product of an epihalohydrin and a polyhydric phenol, as exemplified by bisphenol-epichlorohydrin. Suitable epoxide resins include the reaction products of epihalohydrins and a polyhydric alcohol such as ethylene glycol, propylene glycol, trimethylene glycol and the like. Other equivalent epoxide resins are well known to those skilled in the plastics art.

Other suitable thermosetting resins include polyester resins, and in particular the alkyd resins comprising the reaction product or copolymers of phthalic anhydride and a polyhydric alcohol such as ethylene glycol, diethylene glycol or glycerin, maleic anhydride and a polyhydric alcohol, sebacic acid and a polyhydric alcohol, and diethylene glycol and bis-allyl carbonate. These and equivalent polyester resins are advantageously partially polymerized prior to their incorporation in the plastic composition, and may be modified in the manner known in the art by the admixture therewith of such modifiers, as epoxidized oils and unsaturated fatty acids. If desired, suitable polyester polymerization catalysts well known to the art may also be included in composition.

Other thermosetting polymers that can be employed in the composition include the acrylic compounds, and the phenol-formaldehyde, furfural-formaldehyde, and resorcinol-formaldehyde resins. Moreover, the thermosetting material need not be in every case what is commonly and rather loosely known as a "resin." For example, substances such as phthalic anhydride and diallyl phthalate may be employed as a thermosetting reactive material in the plastic composition.

The apparatus described hereinabove is of simple construction and yet efficiently produces two continuous lengths of coiled material. Maintenance of the apparatus is inexpensive since there is a minimum of moving parts and they themselves are relatively inexpensive.

There has been disclosed heretofore the best embodiment of the invention presently contemplated and it is to be understood that various changes and modifications may be made by those skilled in the art without departing from the spirit of the invention.

What is claimed is:

1. Apparatus for continuously forming a length of adhesively secured filamentary material into a helical coil, said apparatus comprising:
 (a) at least one elongated drum;
 (b) means to rotatably support said drum;
 (c) an inner, flexible mold member having an outwardly facing channel extending the length thereof, said inner mold member having a first portion helically wrapped about and in frictional engagement with said drum and a second portion extending between the ends of said drum, the first and second portions being continuous, whereby said inner mold member is in the form of an endless, circulating belt;
 (d) an outer, flexible mold member helically disposed in confronting, interlocking relationship about the helical length of the first portion of said inner mold member, said outer mold member having an inwardly facing channel extending the length thereof to define a molding cavity between said inner and outer mold members;
 (e) fixed guide means positioned proximate to the path of said inner and outer mold members whereby said mold members are restrained in a predetermined, confronting helical path;
 (f) drive means operatively connected to and adapted to rotate said drum about the longitudinal axis thereof, said interlocked mold members being thereby helically advanced along the longitudinal axis of said drum whereby each interlocked point of said mold members traverses substantially the entire length of said drum; and
 (g) means for feeding resin-coated filamentary fibers into said molding cavity whereby said fibers are molded into a helical coil.

2. The apparatus of claim 1 including heating means to cure the resin coating on said filamentary fibers while the fibers are interposed between and traveling with said mold members.

3. The apparatus of claim 1 wherein said outer mold member is in the form of a T, one of the legs of the T being disposed radially in the assembled condition and being dimensionsed to be frictionally engaged by and easily removable from the channel of said inner mold member.

4. A machine adapted to continuously form a length of adhesively secured filamentary fibers into a helical coil comprising:
 (A) first and second elongated drums rotatably journaled in said machine;
 (B) drive means operatively connected to at least one of said drums, said drive means being arranged to simultaneously rotate said drums in the same angular direction;
 (C) an elongated, flexible inner mold member having a channel facing radially outward from and extending the length thereof, said inner mold member comprising:
  (a) a first portion helically wrapped around the length of said first drum in frictional engagement therewith,
  (b) a second portion extending between adjacent ends of said drums in a transverse plane common thereto,
  (c) a third portion helically wrapped around the length of said second drum in frictional engagement therewith and at an equal but opposite angle to the helical wrap on said first mandrel; and
  (d) a fourth portion extending between the adjacent ends of said drums opposite to said second portion and in a common plane transverse to both of said drums, said four portions of said inner mold member defining an endless circulating belt;
 (D) a first elongated flexible outer mold member having an inwardly facing channel extending the length thereof, said outer mold member comprising:
  (a) a first portion disposed in confronting, interlocking relationship about substantially the entire length of said inner mold member first portion, and
  (b) a second portion spaced from and extending between the opposed ends of said first drum;
 (E) a second elongated, flexible outer mold member comprising:
  (a) a first portion disposed in confronting interlocking relationship about substantially the entire length of said inner mold member third portion; and
  (b) a second portion spaced from and extending between the opposed ends of said second drum;
 (F) a plurality of guide members fixed in a skewed position with respect to the path of said first and second outer mold members whereby said outer mold members are restrained in a predetermined confronting helical path to define a molding cavity between said inner and outer mold members; and
 (G) means for feeding resin-coated filamentary fibers into said mold cavity whereby said fibers are molded into a helical coil.

5. The apparatus of claim 4 including heating means to cure the resin coating on said filamentary fibers while the fibers are interposed between and traveling with said mold members.

6. The apparatus of claim 5 wherein said outer mold member is in the form of a T, one of the legs of the T being disposed radially in the assembled condition and being dimensioned to be frictionally engaged by and easily removable from the channel of said inner mold member.

7. A machine adapted to continuously form a length of adhesively secured filamentary material into a helical coil comprising:
 (A) first and second elongated drums rotatably journaled in said machine;
 (B) drive means operatively connected to at least one of said drums, said drive means being arranged to simultaneously rotate said drums in the same angular direction;
 (C) an elongated, flexible inner mold member having a channel facing radially outward from and extending the length thereof, said inner mold member comprising:
  (a) a first portion helically wrapped around the length of said first drum in frictional engagement therewith,
  (b) a second portion extending between adjacent ends of said drums in a transverse plane common thereto,
  (c) a third portion helically wrapped about the length of said second drum in frictional engagement therewith and at an equal but opposite angle to the helical wrap on said first drum, and (d) a fourth portion extending between the adjacent ends of said drums opposite to said second portion and in a common plane transverse to both of said drums, said four portions of said inner mold member defining an endless circulating belt;

(D) an elongated, flexible outer mold member having an inwardly facing channel extending the length thereof, said outer mold member comprising:

(a) a first portion disposed in confronting interlocking relationship about substantially the entire length of said inner mold member first portion, (b) a second portion extending between adjacent ends of said drums in a transverse plane common thereto, (c) a third portion disposed in confronting, interlocking relationship about substantially the entire length of said inner mold member third portion, and (d) a fourth portion extending between the adjacent ends of said drums opposite to said outer mold member second portion and in a common plane transverse to both of said drums, said four portions of said outer mold member defining an endless circulating belt; and (E) a plurality of guide members fixed in a skewed position with respect to the path of said outer mold member whereby said outer mold member is restarined in a predetermined confronting helical path to define a molding cavity between said inner and outer mold members; and (F) means for feeding resin coated filamentary fibers into said mold cavity whereby said material is molded into a helical coil.

8. The apparatus of claim 7 including heating means to cure the resin coating on said filamentary fibers while the fibers are interposed between and traveling with said mold members.

9. The apparatus of claim 7 wherein said outer mold member is in the form of a T, one of the legs of the T being disposed radially in the assembled condition and being dimensioned to be frictionally engaged by and easily removed from the channel of said inner mold member.

References Cited
UNITED STATES PATENTS 3,089,535   5/1963   Vohrer et al. ___ 156—582 XR
2,852,424   9/1958   Reinhart et al. ___ 156—175 XR EARL M. BERGERT, *Primary Examiner.*

PHILIP DIER, *Examiner.*